United States Patent
Nagata et al.

(10) Patent No.: US 11,087,155 B2
(45) Date of Patent: Aug. 10, 2021

(54) IDENTIFICATION DEVICE, IDENTIFICATION METHOD, IDENTIFICATION SYSTEM, AND RECORDING MEDIUM

(71) Applicant: Panasonic Intellectual Property Management Co., Ltd., Osaka (JP)

(72) Inventors: Keisuke Nagata, Osaka (JP); Takahiko Kamitsuji, Osaka (JP); Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/897,826

(22) Filed: Jun. 10, 2020

(65) Prior Publication Data

US 2020/0302198 A1    Sep. 24, 2020

Related U.S. Application Data

(63) Continuation of application No. PCT/JP2019/037090, filed on Sep. 20, 2019.

(30) Foreign Application Priority Data

Sep. 28, 2018    (JP) .............................. JP2018-184210

(51) Int. Cl.
*G06K 9/00* (2006.01)

(52) U.S. Cl.
CPC ..... *G06K 9/00825* (2013.01); *G06K 9/00805* (2013.01); *G06K 9/00812* (2013.01)

(58) Field of Classification Search
CPC ........... G06K 9/00825; G06K 9/00805; G06K 9/00812; G06K 9/00664; G06K 9/0063;

(Continued)

(56) References Cited

U.S. PATENT DOCUMENTS

| | | | | |
|---|---|---|---|---|
| 2007/0221822 A1* | 9/2007 | Stein | .................. | G06K 9/00825 250/205 |
| 2008/0041147 A1* | 2/2008 | David | ..................... | G01L 5/282 73/117.01 |

(Continued)

FOREIGN PATENT DOCUMENTS

| | | |
|---|---|---|
| JP | 09-215676 | 8/1997 |
| JP | 2006-298041 | 11/2006 |

(Continued)

OTHER PUBLICATIONS

Official Communication issued in International Patent Application No. PCT/JP2019/037090, dated Nov. 12, 2019, along with an English translation thereof.

*Primary Examiner* — Nimesh Patel
(74) *Attorney, Agent, or Firm* — Greenblum & Bernstein, P.L.C.

(57) ABSTRACT

An identification device includes: an operation generator that generates a first operation pattern to be executed by a first moving body among moving bodies, and transmits the first operation pattern to the first moving body; an operation detector that detects second operation patterns executed by the moving bodies, using at least one image obtained by at least one image obtaining device; and a target identifier that obtains, from the first moving body, a time at which the first moving body executed the first operation pattern, and compares the first operation pattern with a second operation pattern detected at the time from second operation patterns to determine whether these patterns match each other. When determining that they match each other, the target identifier identifies, as the first moving body, a moving body that is included in at least one image and executed the second operation pattern detected at the time.

12 Claims, 15 Drawing Sheets

(58) Field of Classification Search
CPC ............ G06K 9/00791; G06K 9/6262; G06K 9/6288; G06K 9/00845; G06K 9/6256; G06K 9/00744; G06K 9/00832; G06K 9/00892; G06K 9/3241; G06K 9/00288; G06K 9/00228; G06K 9/00221; G06K 9/00677; G06K 9/6201; G06K 9/00496; G06K 9/6267; G06K 9/00671; G06K 9/00771; G06K 9/00798; G06K 9/6217; G06K 9/00785; G06K 2209/23; G06K 2209/15; G06K 9/46; G06K 9/0002; G06K 9/00087; G06K 9/0057; G06K 9/00013; G08G 1/04; G08G 1/14; G08G 1/09; G08G 1/167; G08G 1/165; G08G 1/166; G08G 1/164; G08G 1/096775; G08G 1/054; G08G 1/09675; G08G 1/20; G08G 1/017; G08G 1/096716; G08G 1/096741; G06T 7/00; G06T 2207/30261; G06T 2207/30256; G06T 7/62; G06T 2207/10016; G06T 7/215; G06T 7/246; G06T 7/136; G06T 2207/10024; G06T 2207/20084; G06T 2207/20101; G06T 2207/20104; G06T 7/174; G06T 7/55; G06T 2207/30252; G06T 7/80; G06T 3/4038; G06T 7/85; G06T 2207/30244; G06T 7/248; G06N 20/00; G06N 7/005; G06N 3/0454; G06N 3/02; G06N 3/0472; G06N 3/126; G06N 3/0427; G06N 5/003; G06N 3/0436; G06N 3/08; G05B 23/0264; G05B 19/4184; G05B 19/41845; G05B 19/41865; G05B 19/41875; G05B 23/0229; G05B 23/024; G05B 23/0283; G05B 23/0297; G05B 2219/37537; G05B 23/0208; G05B 2219/33331; G05B 19/418; G05B 2219/31001; G05B 2219/31457; Y02P 90/02; Y02P 90/80; G01M 11/067; G01M 17/00; G01M 17/007; G01M 11/00; G01M 11/062; G01M 11/065; G01M 3/38; G01M 11/06; G01M 11/064; G01M 17/027; G01M 17/045; G01M 13/025; G01M 7/00; G01M 7/025; H04W 4/38; H04W 4/70; H04W 84/18; H04W 4/35; H04W 4/00; H04W 4/023; H04W 4/027; H04W 4/40; H04W 4/02; H04W 4/029; H04W 64/00; H04W 88/06; H04W 88/02; H04W 12/79; H04W 4/025; H04W 4/024; H04W 4/44; B60W 10/20; B60W 30/16; B60W 10/18; B60W 30/02; B60W 30/04; B60W 50/00; B60W 2420/42; B60W 2050/0082; B60W 50/085; B60W 20/00; G05D 1/0246; G05D 1/0274; G05D 2201/0213; G05D 1/0257; G05D 1/0221; G05D 1/0225; G05D 1/0088; G05D 1/0276; G05D 1/0234; G05D 1/0011; G05D 1/0251; B62D 6/00; B62D 15/021; B62D 15/0295; B62D 15/0245; B62D 5/049; B62D 5/0457; B62D 65/026; B62D 65/14; B60R 21/0134; B60R 1/00; B60R 2300/205; B60R 25/04; B60R 2300/105; B60R 11/04; B60R 2300/402; B60R 2300/8086; B60R 2300/8093; B60R 2300/303; B60R 2011/004; B60R 2011/005; B60Q 1/143; B60Q 2300/41; B60Q 2300/42; B60Q 2300/45; B60Q 9/00; G08C 17/02; G08C 2201/92; G08C 2201/93; G06F 21/32; G06F 3/1423; G06F 1/3206; G06F 1/3209; G06F 1/3287; G06F 3/04845; F02D 41/0032; F02D 41/042; F02D 41/062; G09G 2340/14; G09G 2380/10; G09G 3/002; G09G 3/003; G09G 2320/0626; G09G 3/34; G09G 3/3406; B60L 53/126; B60L 53/36; B60L 53/37; B60L 53/39; B60L 53/62; B60L 53/65; B60L 53/66; F16H 2061/0223; F16H 2063/426; F16H 2061/0087; F16H 61/00; B60T 2270/406; B60T 7/00; B60T 8/36; B60T 8/885; B60H 1/2218; B60H 2001/2253; B60H 1/00378; B60H 1/00828; B60H 1/00849; F16D 2500/10412; F16D 2500/50251; F16D 3/38; F16D 48/06; H01R 13/193; H01R 13/6683; H01R 2201/20

See application file for complete search history.

(56) References Cited

U.S. PATENT DOCUMENTS

| 2012/0083960 | A1  | 4/2012 | Zhu et al. |             |
|--------------|-----|--------|------------|-------------|
| 2014/0043473 | A1* | 2/2014 | Gupta      | H04N 17/002 |
|              |     |        |            | 348/135     |
| 2018/0033221 | A1* | 2/2018 | Zhai       | G08B 29/18  |
| 2020/0065593 | A1* | 2/2020 | Jamieson   | B60Q 1/1423 |

FOREIGN PATENT DOCUMENTS

| JP | 2013-544696 | 12/2013 |
|----|-------------|---------|
| WO | 2012/047977 | 4/2012  |

\* cited by examiner

IDENTIFICATION DEVICE, IDENTIFICATION METHOD, IDENTIFICATION SYSTEM, AND RECORDING MEDIUM

CROSS REFERENCE TO RELATED APPLICATION

This is a continuation application of PCT International Application No. PCT/JP2019/037090 filed on Sep. 20, 2019, designating the United States of America, which is based on and claims priority of Japanese Patent Application No. 2018-184210 filed on Sep. 28, 2018.

BACKGROUND

1. Technical Field

The present disclosure relates to an identification device, an identification method, an identification system, and a recording medium.

2. Description of the Related Art

Japanese Unexamined Patent Application Publication No. 9-215676 (Patent Literature (PTL) 1) discloses a technique for use in a system for giving an operation instruction to an object to be identified, to determine that an object, among a plurality of objects captured by a camera, which has executed the operation instruction is the object to be identified.

SUMMARY

However, the system according to the aforementioned PTL 1 can be improved upon.

In view of this, the present disclosure provides an identification device and so on capable of improving upon the above related art.

An identification device according to one aspect of the present disclosure is an identification device for identifying one or more moving bodies, and includes: an operation generator that generates a first operation pattern to be executed by a first moving body which is at least one of the one or more moving bodies, and transmits the first operation pattern to the first moving body; an operation detector that detects one or more second operation patterns executed by the one or more moving bodies, using at least one image obtained by at least one image obtaining device; and a target identifier that obtains, from the first moving body, a time at which the first moving body has executed the first operation pattern, and compares the first operation pattern generated by the operation generator with a second operation pattern detected at the time from the one or more second operation patterns to determine whether the second operation pattern matches the first operation pattern. When determining that the second operation pattern matches the first operation pattern, the target identifier identifies, as the first moving body, a moving body that is included in the at least one image and has executed the second operation pattern detected at the time.

General and specific aspects disclosed above may be implemented using a system, a method, an integrated circuit, a computer program, or a computer-readable recording medium such as a CD-ROM, or any combination thereof.

The identification device according to one aspect of the present disclosure is capable of further improving upon the related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
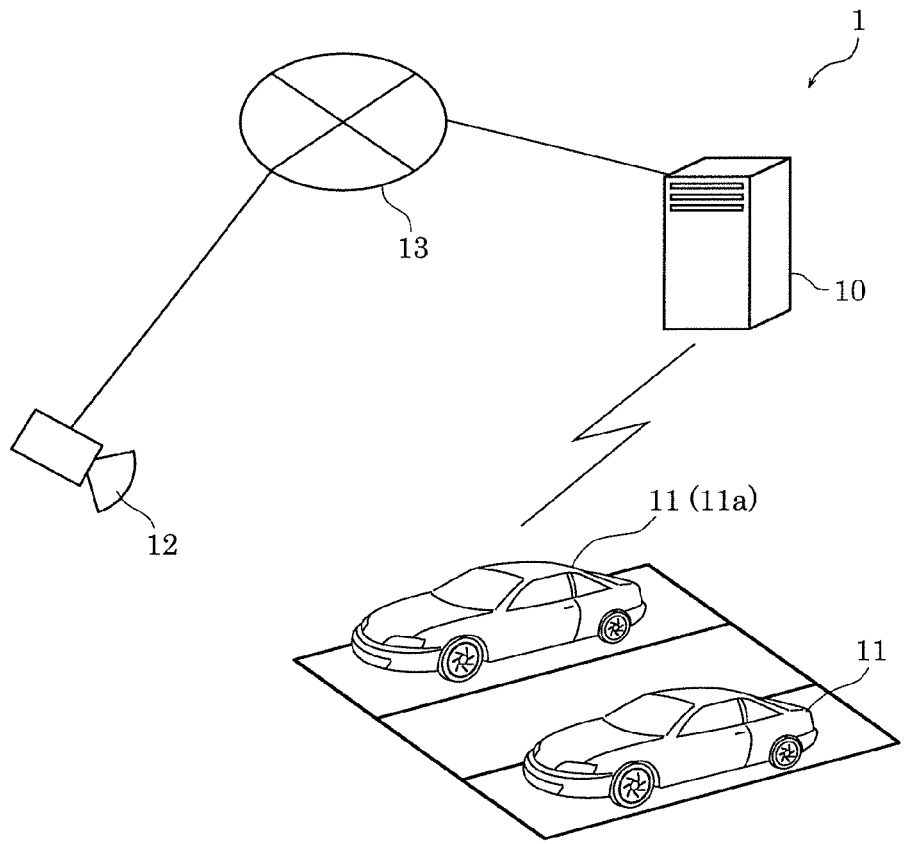
FIG. 1 is a diagram illustrating an example of an overall configuration of an identification system according to Embodiment 1.

The inventors of the present disclosure have discovered the following problems concerning the system disclosed in the aforementioned PTL 1 described in the section of "Description of the Related Art". Namely, with the conventional system disclosed in the aforementioned PTL 1, there is a high risk that an object to be identified is misidentified when the object is a moving body such as a vehicle.

In view of this, an identification device according to one aspect of the present disclosure is an identification device for identifying one or more moving bodies, and includes: an operation generator that generates a first operation pattern to be executed by a first moving body which is at least one of the one or more moving bodies, and transmits the first operation pattern to the first moving body; an operation detector that detects one or more second operation patterns executed by the one or more moving bodies, using at least one image obtained by at least one image obtaining device; and a target identifier that obtains, from the first moving body, a time at which the first moving body has executed the first operation pattern, and compares the first operation pattern generated by the operation generator with a second operation pattern detected at the time from the one or more second operation patterns to determine whether the second operation pattern matches the first operation pattern. When determining that the second operation pattern matches the first operation pattern, the target identifier identifies, as the first moving body, a moving body that is included in the at least one image and has executed the second operation pattern detected at the time.

The identification device according to one aspect of the present disclosure thus obtains, from a first moving body that is an object to be identified and has executed the first operation pattern, the time of the execution of the first operation pattern by the first moving body. This makes it possible to compare the generated first operation pattern with the second operation pattern detected at the obtained time to determine whether the first operation pattern matches the second operation pattern.

Accordingly, it is possible to identify, as the first moving body, a moving body that is included in at least one image and has executed the second operation pattern that matches the first operation pattern. It is therefore possible to inhibit misidentification of identifying, as an object to be identified, a moving body other than the moving body that has executed the first operation pattern. In other words, it is possible to reduce the misidentification of an object to be identified.

For example, the first operation pattern and the second operation pattern may be each a pattern in which a light included in the first moving body is controlled.

This makes it easier to recognize, from outside, an operation pattern executed by a moving body, and this in turn makes it possible to accurately detect a second operation pattern from at least one image obtained by at least one image obtaining device.

The first moving body may be a vehicle, and the first operation pattern and the second operation pattern may be each a pattern in which turning on and off of at least one of headlights, direction-indicator lamps, or tail lamps of the vehicle is controlled.

This further enables the detection not only of the size of a vehicle but also of the orientation of the vehicle based on the full width and full length of the vehicle.

The identification device may further include an anomaly detector that detects an anomaly in the first moving body identified by the target identifier. The operation generator may further transmit the first operation pattern to the first moving body at predetermined time intervals. The operation detector may further detect, at the predetermined time intervals, a third operation pattern executed by the first moving body, using at least one image obtained by the at least one image obtaining device. The anomaly detector may compare the third operation pattern with the first operation pattern, and detect an anomaly in the first moving body when the third operation pattern does not match the first operation pattern.

The identification device may further include a target location specifier that specifies a location of the first moving body on a map based on (i) map information indicating the map including at least an area capable of accommodating the one or more moving bodies, (ii) locations, in the at least one image, of the one or more moving bodies that have executed the one or more second operation patterns detected by the operation detector, and (iii) the first moving body that is included in the at least one image and has been identified by the target identifier.

When specifying the location of the first moving body on the map, the target location specifier may further transmit the location specified on the map to the first moving body to cause the first moving body to correct location information held by the first moving body.

The identification device may further include a target tracer that obtains time-series locations that are locations, which are indicated on the map and are obtained at predetermined time intervals, of the first moving body identified by the target identifier. The operation generator may transmit the first operation pattern to the first moving body at the predetermined time intervals. The operation detector may detect at the predetermined time intervals, a third operation pattern executed by the first moving body, using at least one image obtained by the at least one image obtaining device. The target identifier may determine whether the third operation pattern matches the first operation pattern, and identify again the first moving body in the at least one image when the third operation pattern matches the first operation pattern. The target location specifier may specify the location of the first moving body on the map at the predetermined time intervals based on the map information and a location, in the at least one image, of the first moving body identified again by the target identifier. The target tracer may obtain the time-series locations by obtaining the locations of the first moving body on the map at the predetermined time intervals, the locations being each specified by the target location specifier.

When obtaining, from the first moving body, a predetermined operation pattern generated by the first moving body and a time at which a combined operation pattern has been executed, the combined operation pattern being generated by combining the predetermined operation pattern with the first operation pattern, the target identifier may compare the combined operation pattern with the second operation pattern detected at the time from the one or more second operation patterns to determine whether the second operation pattern matches the combined operation pattern. When determining that the second operation pattern matches the combined operation pattern, the target identifier may identify, as the first moving body, a moving body that is included in the at least one image and has executed the second operation pattern detected at the time.

An identification device according to one aspect of the present disclosure is an identification device for identifying one or more moving bodies, and includes: an operation generator that generates a first operation pattern to be executed by a first moving body which is at least one of the one or more moving bodies, and transmits the first operation pattern to the first moving body; an operation detector that detects one or more second operation patterns executed by the one or more moving bodies, using at least one image obtained by at least one image obtaining device; a target identifier that compares each of the one or more second operation patterns detected by the operation detector with the first operation pattern generated by the operation generator to determine whether the second operation pattern matches the first operation pattern, and identifies, as the first moving body, a moving body that is included in the at least one image and has executed the second operation pattern determined to match the first operation pattern; and a target location specifier that specifies a location of the first moving body on a map based on (i) map information indicating the map including at least an area capable of accommodating the one or more moving bodies, (ii) locations, in the at least one image, of the one or more moving bodies that have executed the one or more second operation patterns detected by the operation detector, and (iii) the first moving body that is included in the at least one image and has been identified by the target identifier.

An identification method according to one aspect of the present disclosure is an identification method for identifying one or more moving bodies, and includes: generating a first operation pattern to be executed by a first moving body which is at least one of the one or more moving bodies, and transmitting the first operation pattern to the first moving body; detecting one or more second operation patterns executed by the one or more moving bodies, using at least one image obtained by at least one image obtaining device; and obtaining, from the first moving body, a time at which the first moving body has executed the first operation pattern, and comparing a second operation pattern detected at the time from the one or more second operation patterns with the first operation pattern generated in the generating to determine whether the second operation pattern matches the first operation pattern. In the comparing, when it is determined that the second operation pattern matches the first operation pattern, identifying, as the first moving body, a moving body that is included in the at least one image and has executed the second operation pattern detected at the time.

An identification system according to one aspect of the present disclosure is an identification system including one or more moving bodies and an identification device for identifying the one or more moving bodies, and includes: an operation generator that generates a first operation pattern to be executed by a first moving body which is at least one of the one or more moving bodies, and transmits the first operation pattern to the first moving body; an operation detector that detects one or more second operation patterns executed by the one or more moving bodies, using at least one image obtained by at least one image obtaining device; and a target identifier that obtains, from the first moving body, a time at which the first moving body has executed the first operation pattern, and compares the first operation pattern generated by the operation generator with a second operation pattern detected at the time from the one or more second operation patterns to determine whether the second operation pattern matches the first operation pattern. When determining that the second operation pattern matches the first operation pattern, the target identifier identifies, as the first moving body, a moving body that is included in the at least one image and has executed the second operation pattern detected at the time. Each of the one or more moving bodies includes: an operation executor that executes an operation pattern received from the identification device; and an operation information notifier that notifies the identification device of a time at which the operation executor has executed the operation pattern received.

Note that these comprehensive or concrete embodiments may be realized by a system, a method, an integrated circuit, a computer program, or a computer-readable recording medium such as a CD-ROM, or may be realized by any combination thereof.

The following describes, in greater detail, embodiments according to one or more aspects of the present disclosure with reference to the drawings.

Note that the embodiments described below each show a comprehensive or concrete embodiment of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements. The drawings are presented schematically and are not necessarily precise illustrations. In addition, like reference signs indicate like elements in the drawings.

Embodiment 1

[Overall Configuration of System]

FIG. 1 is a diagram illustrating an example of an overall configuration of identification system 1 according to Embodiment 1.

Identification system 1 includes identification device 10, one or more moving bodies 11, and at least one image capturing device 12, as illustrated in FIG. 1. Identification device 10 is capable of wirelessly communicating with one or more moving bodies 11. Identification device 10 is connected to at least one image capturing device 12 via network 13. Identification device 10 may be either directly connected with at least one image capturing device 12 through wired communication or connected through wireless communication.

[Moving Body 11]

Figure 2:
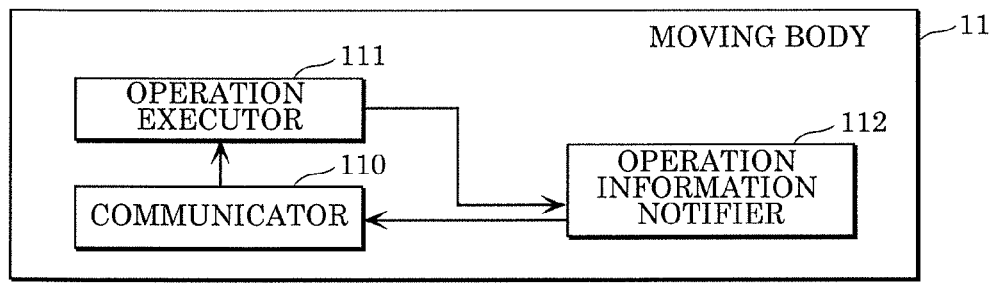
FIG. 2 is a diagram illustrating an example of a functional configuration of a moving body according to Embodiment 1.

FIG. 2 is a diagram illustrating an example of a functional configuration of moving body 11 according to Embodiment 1.

Moving body 11 includes communicator 110, operation executor 111, and operation information notifier 112, as illustrated in FIG. 2. Moving body 11 is one example of one or more moving bodies, and is a motor vehicle such as a car, a motorized two-wheel vehicle, a drone, or an autonomous mobile robot such as a robotic vacuum cleaner. The present embodiment describes the case where moving body 11 is a vehicle. The following describes each of the elements included in moving body 11.

<Communicator 110>

Communicator 110 is a communication interface that wirelessly communicates with identification device 10. Wi-Fi (®) or Bluetooth (®) is used for the wireless communication. In the present embodiment, communicator 110 wirelessly communicates with identification device 10. Communicator 110 receives an operation pattern to be executed by, for example, moving body 11, and transmits the operation pattern to operation executor 111. Communicator 110 transmits also information notified by operation information notifier 112 to identification device 10.

<Operation Executor 111>

Operation executor 111 executes an operation pattern received from identification device 10.

The operation pattern may be a pattern in which a light included in moving body 11 is controlled. Note, however, that the operation pattern is not limited to this, and needs to be an operation in which an externally recognizable operation such as a forward or backward operation of moving body 11 or turning on and off of a light is repeated for more than one time, or an operation in which any of these operations are combined. Since moving body 11 is a vehicle in this embodiment, the operation pattern may be an operation in which turning on and off of a light, a wiper operation, or steering control is repeated for more than one time, or an operation in which any of these operations are combined. Moreover, the operation pattern may be a pattern in which turning on and off of at least one of headlights, direction-indicator lamps, or tail lamps of moving body 11 that is a vehicle is controlled. In other words, when moving body 11 is a vehicle, the operation pattern may be a turning on and off pattern of each of headlights, direction-indicator lamps, and tail lamps, and needs to be an operation by which the vehicle is uniquely identifiable from outside when the vehicle is captured by a camera, for instance.

Operation executor 111 thus executes an operation pattern which is received from identification device 10 and is a pattern by which moving body 11 is uniquely identifiable from outside.

<Operation Information Notifier 112>

Operation information notifier 112 notifies a time at which operation executor 111 has executed the operation pattern received from identification device 10. More specifically, operation information notifier 112 notifies identification device 10 of operation information indicating the time at which operation executor 111 has executed the operation pattern received from identification device 10 via communicator 110. The operation pattern received from identification device 10 is an operation pattern that is an operation by which moving body 11 is uniquely identifiable from outside, as described above.

<Identification Device 10>

Figure 3:
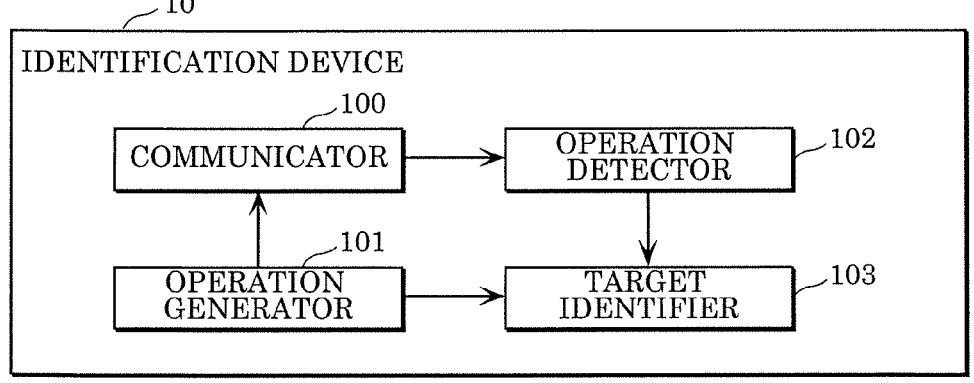
FIG. 3 is a diagram illustrating an example of a functional configuration of an identification device according to Embodiment 1.

FIG. 3 is a diagram illustrating an example of a functional configuration of identification device 10 according to Embodiment 1.

Identification device 10 is a device for identifying one or more moving bodies which are each an object to be identified. Identification device 10 includes communicator 100, operation generator 101, operation detector 102, and target identifier 103. Identification device 10 is realized by, for example, a computer including a processor (microprocessor), a memory, a communication interface, etc.

<Communicator 100>

Communicator 100 is a communication interface that wirelessly communicates with each of one or more moving bodies 11 and communicates with at least one image capturing device 12 via network 13. In this embodiment, communicator 100 communicates with moving body 11 to be identified (hereinafter referred to as first moving body 11a), and transmits an operation pattern generated by operation generator 101, as illustrated in FIG. 1, for instance. Communicator 100 also communicates with at least one image capturing device 12 via network 13 and receives at least one image captured by at least one image capturing device 12.

<Operation Generator 101>

Operation generator 101 generates a first operation pattern to be executed by a first moving body which is at least one of one or more moving bodies, and transmits the first operation pattern to the first moving body. In this embodiment, operation generator 101 generates an operation pattern to be executed by first moving body 11a which is moving body 11 to be identified among moving bodies 11, and transmits the operation pattern to first moving body 11a via communicator 100. In the example illustrated in FIG. 1, operation generator 101 generates a first operation pattern to be executed by first moving body 11a which is one of two moving bodies 11, and transmits the first operation pattern to first moving body 11a. Since the detail of the operation pattern has been described above, the description is omitted.

<Operation Detector 102>

Operation detector 102 detects one or more second operation patterns executed by one or more moving bodies, using at least one image captured by at least one image obtaining device. In this embodiment, operation detector 102 detects one or more operation patterns executed by one or more moving bodies 11, using at least one image that is obtained by at least one image capturing device 12 which is at least one image obtaining device, and that is received via network 13. In the example illustrated in FIG. 1, operation detector 102 detects one or more second operation patterns executed by at least one of two moving bodies 11, using at least one image including two moving bodies 11 captured by at least one image capturing device 12.

<Target Identifier 103>

Target identifier 103 obtains, from a first moving body, a time at which the first moving body has executed the first operation pattern. Target identifier 103 compares the first operation pattern generated by operation generator 101 with a second operation pattern detected at the time from one or more second operation patterns, to determine whether the second operation pattern matches the first operation pattern. When determining that the second operation pattern detected at the time matches the first operation pattern, target identifier 103 identifies, as the first moving body, a moving body that is included in at least one image and has executed the second operation pattern detected at the time.

In the example illustrated in FIG. 1, target identifier 103 obtains, from first moving body 11a that is an object to be identified and has executed the first operation pattern, the time of the execution of the first operation pattern by first moving body 11a. Moreover, target identifier 103 compares the first operation pattern generated by operation generator 101 with the second operation pattern detected at the obtained time by operation detector 102, to determine whether these patterns match each other. When determining that the patterns match each other, target identifier 103 then identifies, as first moving body 11a that has executed the first operation pattern generated by operation generator 101, moving body 11 that is included in at least one image and has executed the second operation pattern detected at the obtained time by operation detector 102.

Target identifier 103 thus determines, using only the second operation pattern detected at the obtained time by operation detector 102, whether moving body 11 that is included in at least one image and has executed the second operation pattern is first moving body 11a which has executed the first operation pattern. In this way, moving body 11 that has executed the second operation pattern at the obtained time is targeted, and it is thus possible to identify first moving body 11a in at least one image including moving bodies 11. This makes it possible to surely identify first moving body 11a from one or more moving bodies 11 included in at least one image.

[Image Capturing Device 12]

Image capturing device 12 is one example of at least one image obtaining device and obtains at least one image. What is required of image capturing device 12 is to obtain, through capturing or the like, at least one image to be used for detecting an operation pattern executed by moving body 11 to be identified. Image capturing device 12 may be, for example, a camera such as an infrastructure camera including a surveillance camera, or a sensor capable of obtaining moving pictures, etc. Alternatively, image capturing device 12 may be a satellite, an unmanned aerial vehicle such as a drone, or a group of cameras or sensors, each of which is included in a corresponding one of moving bodies 11 and is capable of capturing moving pictures.

In the example illustrated in FIG. 1, image capturing device 12 is a surveillance camera that takes a video of an area including two moving bodies 11 as an image capture area.

[Operation of Identification Device 10]

Next, an operation performed by identification device 10 configured as above will be described.

Figure 4:
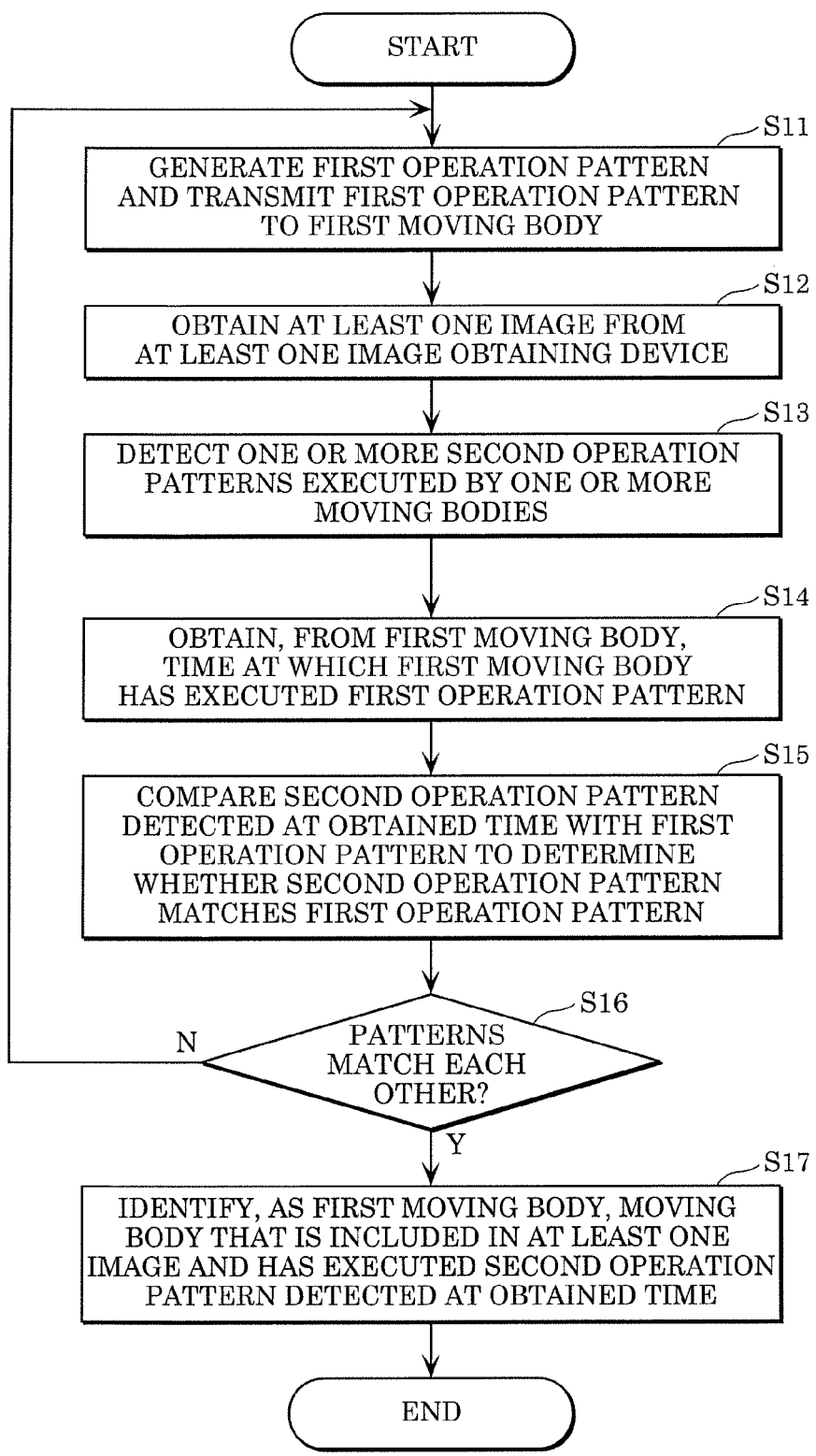
FIG. 4 is a flowchart illustrating an example of an operation performed by the identification device according to Embodiment 1.

FIG. 4 is a flowchart illustrating an example of the operation performed by identification device 10 according to Embodiment 1.

First, identification device 10 generates a first operation pattern and transmits the first operation pattern to a first moving body (S11). More specifically, identification device 10 generates a first operation pattern to be executed by first moving body 11a to be identified among moving bodies 11, and transmits the first operation pattern to first moving body 11a.

Subsequently, identification device 10 obtains at least one image from at least one image obtaining device (S12). More specifically, identification device 10 obtains, from image capturing device 12, at least one image that is obtained by image capturing device 12 and is to be used for detecting an operation pattern executed by moving body 11 to be identified.

Identification device 10 then detects one or more second operation patterns executed by one or more moving bodies (S13). More specifically, identification device 10 detects one or more second operation patterns executed by one or more moving bodies 11, using at least one image obtained by image capturing device 12.

Subsequently, identification device 10 obtains, from the first moving body, a time at which the first moving body has executed the first operation pattern (S14). More specifically, identification device 10 obtains, from first moving body 11a that is to be identified and has executed the first operation pattern, the time of the execution of the first operation pattern by first moving body 11a. The order of performing steps S13 and S14 is not limited to this order and may be reversed.

Identification device 10 then compares the second operation pattern detected at the time obtained at step S14 with the first operation pattern to determine whether these patterns match each other (S15). More specifically, identification device 10 compares the generated first operation pattern with the second operation pattern detected at the time obtained at step S14, and determines whether the generated first operation pattern matches the second operation.

Subsequently, when the patterns match each other (Y in S16), identification device 10 identifies, as the first moving body, a moving body that is included in at least one image and has executed the second operation pattern detected at the time obtained at step S14 (S17). When the patterns do not match each other (N in S16), identification device 10 returns to step S11.

[Advantageous Effects, Etc.]

Moving body 11 to be identified by identification device 10 is, for example, a vehicle, a robot, or a drone. Therefore, when a plurality of moving bodies are present in at least one image obtained by at least one image obtaining device, the plurality of moving bodies may include, besides a moving body that has executed a first operation pattern transmitted thereto, a moving body that has executed an operation similar to the first operation pattern. In such a case, a moving body other than the moving body that has executed the first operation pattern transmitted may be misidentified as an object to be identified.

In view of this, identification device 10 according to the present embodiment obtains, from first moving body 11a that is to be identified and has executed the first operation pattern, the time of the execution of the first operation pattern by first moving body 11a. This enables identification device 10 according to the present embodiment to compare the generated first operation pattern with the second operation pattern detected at the obtained time, to determine whether the patterns match each other. In this way, it is possible to identify, as the first moving body, a moving body that is included in at least one image and has executed the second operation pattern that matches the first operation pattern. This can inhibit misidentification of identifying, as an object to be identified, moving body 11 other than moving body 11 that has executed the first operation pattern. In other words, it is possible to reduce the misidentification of an object to be identified.

The first operation pattern and the second operation pattern may be each a pattern in which a light included in moving body 11 is controlled. With this, it becomes easier to recognize, from outside, an operation pattern executed by moving body 11, and this makes it possible to accurately detect the second operation pattern from at least one image obtained by image capturing device 12. Since identification device 10 can be utilized even while moving body 11 is moving, and what is more, an operation pattern is recognizable even in a bad weather, it is possible to accurately detect the second operation pattern from at least one image obtained by image capturing device 12. Accordingly, it is possible to accurately identify, as the first moving body, a moving body that is included in at least one image and has executed the second operation pattern that matches the first operation pattern. In other words, it is possible to reduce even more the misidentification of an object to be identified.

Moving body 11 may be a vehicle, and the first operation pattern and the second operation pattern may be each a pattern in which turning on and off of at least one of headlights, direction-indicator lamps, or tail lamps of the vehicle is controlled. The headlights are symmetrically mounted on the front of the vehicle, the tail lamps are symmetrically mounted on the rear of the vehicle, and a direction-indicator lamp is mounted on each of the left and right sides of the vehicle. With this, since the headlights, direction-indicator lamps, and tail lamps are turned on and off, it is possible to detect not only the size but also the orientation of the vehicle based on the full width and the full length of the vehicle.

Moreover, since only one of headlights, and direction-indicator lamps and tail lamps is turned on and off, it is possible to prevent the lights of moving body 11 that is not an object to be identified from being accidentally controlled by the user, and this can reduce the risk of accidental misidentification.

Coding technology may be applied to the control of turning on and off of headlights, for instance. In this case, the transmission not only of operation patterns but also of various kinds of information is enabled.

Furthermore, with identification system 1 according to the present embodiment, it is possible to verify moving body 11 by causing moving body 11, such as a vehicle, to execute a predetermined operation and detecting the predetermined operation from at least one image obtained by image capturing device 12 such as a surveillance camera.

Figure 5:
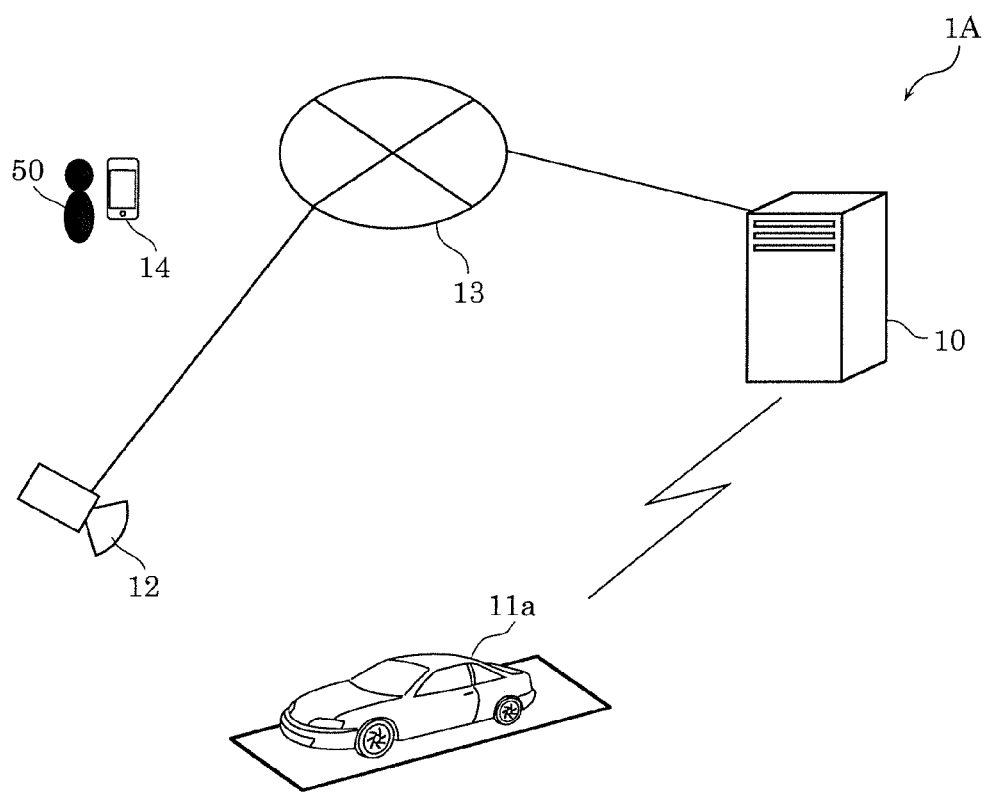
FIG. 5 is a diagram illustrating another example of the overall configuration of the identification system according to Embodiment 1.

FIG. 5 is a diagram illustrating another example of an overall configuration of identification system 1 according to Embodiment 1. Identification system 1A illustrated in FIG. 5 is different from identification system 1 illustrated in FIG. 1 in that only moving body 11a is presented as an object to be identified and that portable terminal 14 and user 50 are added. Portable terminal 14 is, for example, a smartphone or a tablet, and communicates with identification device 10 wirelessly or via a public network. User 50 is a user of portable terminal 14 and is also a user of first moving body 11a.

First, assuming that user 50 transmits, to identification device 10 and using portable terminal 14, information indicating that user 50 has stopped vehicle xxx, which is first moving body 11a, at location yyy. Identification device 10 then transmits a first operation pattern to first moving body 11a which is vehicle xxx, to instruct first moving body 11a to execute the first operation pattern. Image capturing device 12, which is a camera that monitors location yyy, detects an operation performed by vehicle xxx at location yyy, that is, a second operation pattern, and transmits the result of the detection to identification device 10. With this, identification device 10 checks that first moving body 11a which is vehicle xxx is located at location yyy.

In this way, with identification system 1A, it is possible to check that first moving body 11a is in a proper location where first moving body 11a is stopped, by causing first moving body 11a to execute a predetermined operation and detecting the predetermined operation from at least one image obtained by image capturing device 12 such as a surveillance camera. Thus, it is possible to verify first moving body 11a by causing first moving body 11a to execute a predetermined operation.

Identification system 1 or identification system 1A may be applied to an automatic valley parking. By causing vehicle xxx to stop at a predetermined location near the entrance of the automatic valley parking, vehicle xxx can be verified. It is therefore possible to cause vehicle xxx, of which the driver is not on board, to operate autonomous driving to park at a predetermined parking location in the automatic valley parking.

The following describes a variation of identification device 10 and so on included in identification system 1 according to Embodiment 1.

Variation 1

[Configuration of Identification Device 10A]

Figure 6:
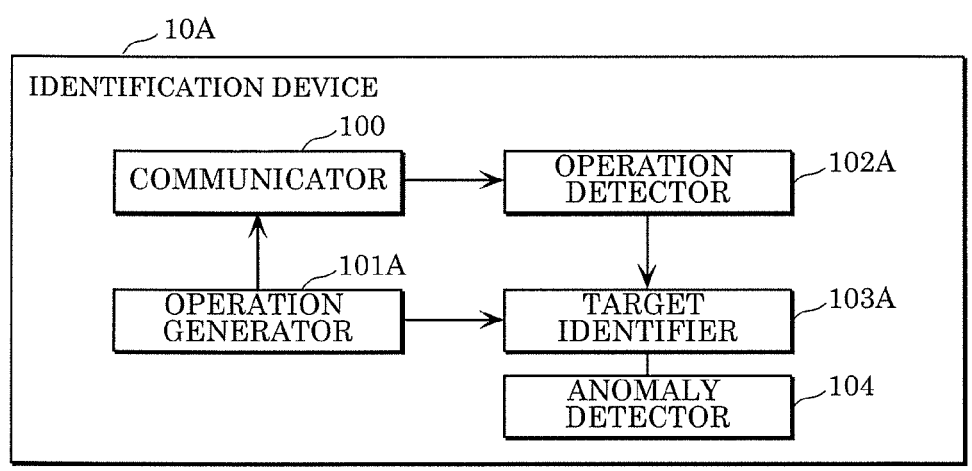
FIG. 6 is a diagram illustrating a functional configuration of an identification device according to Variation 1 of Embodiment 1.

FIG. 6 is a diagram illustrating a functional configuration of identification device 10A according to Variation 1 of Embodiment 1. The elements similar to those illustrated in FIG. 3 are assigned with like reference signs, and the detailed description is omitted.

Identification device 10A illustrated in FIG. 6, as compared to identification device 10 illustrated in FIG. 3, has an additional configuration of anomaly detector 104, and different configurations of operation generator 101A, operation detector 102A, and target identifier 103A. The following focuses on the difference between this variation and Embodiment 1.

<Operation Generator 101A>

Operation generator 101A further transmits a first operation pattern to the first moving body at predetermined time intervals. Referring to the example illustrated in FIG. 1, after first moving body 11a has been identified in at least one image by target identifier 103A, operation generator 101A further generates regularly a first operation pattern to be executed by first moving body 11a and transmits the first operation pattern to first moving body 11a.

It should be noted that a first operation pattern which is regularly generated by operation generator 101A and is to be executed by first moving body 11a may be the same as or different from the first operation pattern used when first moving body 11a in at least one image was identified for the first time by target identifier 103A. When the first operation pattern regularly generated is different from the first operation pattern used for the initial identification of first moving body 11a, operation generator 101A may regularly generate, as a regularly-generated first operation pattern, an anomaly checking operation pattern including a lighting pattern, for instance.

<Operation Detector 102A>

Operation detector 102A further detects, at predetermined time intervals, a third operation pattern executed by the first moving body, using at least one image obtained by at least one image obtaining device. Referring to the example illustrated in FIG. 6, after first moving body 11a has been identified in at least one image by target identifier 103A, operation detector 102A further detects regularly a third operation pattern executed by first moving body 11a, using at least one image that includes first moving body 11a captured by image capturing device 12.

<Target Identifier 103A>

Target identifier 103A compares the third operation pattern with the first operation pattern generated by operation generator 101A to determine whether the third operation pattern matches the first operation pattern. When determining that the third operation pattern matches the first operation pattern, target identifier 103A identifies again first moving body 11a that is included in at least one image and has executed the third operation pattern. It should be noted that when determining that the third operation pattern does not match the first operation pattern, target identifier 103A notifies anomaly detector 104 of the result of the determination.

<Anomaly Detector 104>

Anomaly detector 104 detects an anomaly in the first moving body identified by target identifier 103A. Anomaly detector 104 compares the third operation pattern detected at predetermined time intervals by operation detector 102A with the first operation pattern, and when the third operation pattern does not match the first operation pattern, anomaly detector 104 detects an anomaly in the first moving body identified by target identifier 103A. Referring to the example illustrated in FIG. 6, anomaly detector 104 regularly compares a third operation pattern executed by first moving body 11a with a first operation pattern generated by operation generator 101A. When the third operation pattern does not match the first operation pattern as a result of the comparison, anomaly detector 104 detects an anomaly in first moving body 11a and notifies the result of the detection. An anomaly here means that first moving body 11a does not execute the first operation pattern and this includes a case where first moving body 11a does not obey an instruction from identification device 10A or a case where first moving body 11a does not operate at all. An anomaly also occurs when an electronic device that controls first moving body 11a is taken over or when a virus impeding the operation of the electronic device intrudes into the electronic device.

[Advantageous Effects, Etc.]

According to the present variation, it is possible to further detect an anomaly in a first moving body, by regularly comparing a third operation pattern executed by the first moving body with a first operation pattern generated by operation generator 101A.

Variation 2

[Configuration of Identification Device 10B]

Figure 7:
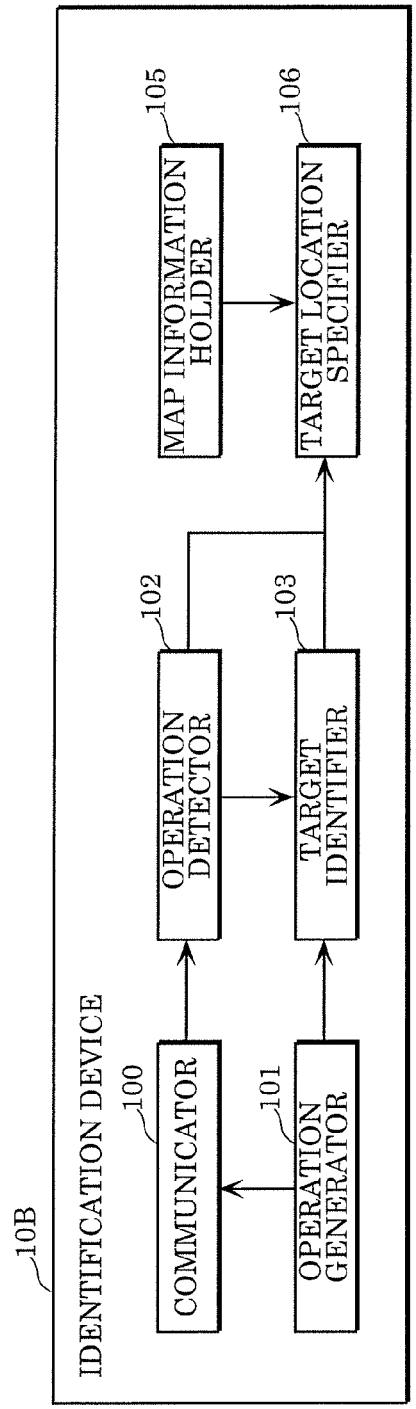
FIG. 7 is a diagram illustrating a functional configuration of an identification device according to Variation 2 of Embodiment 1.
Figure 8:
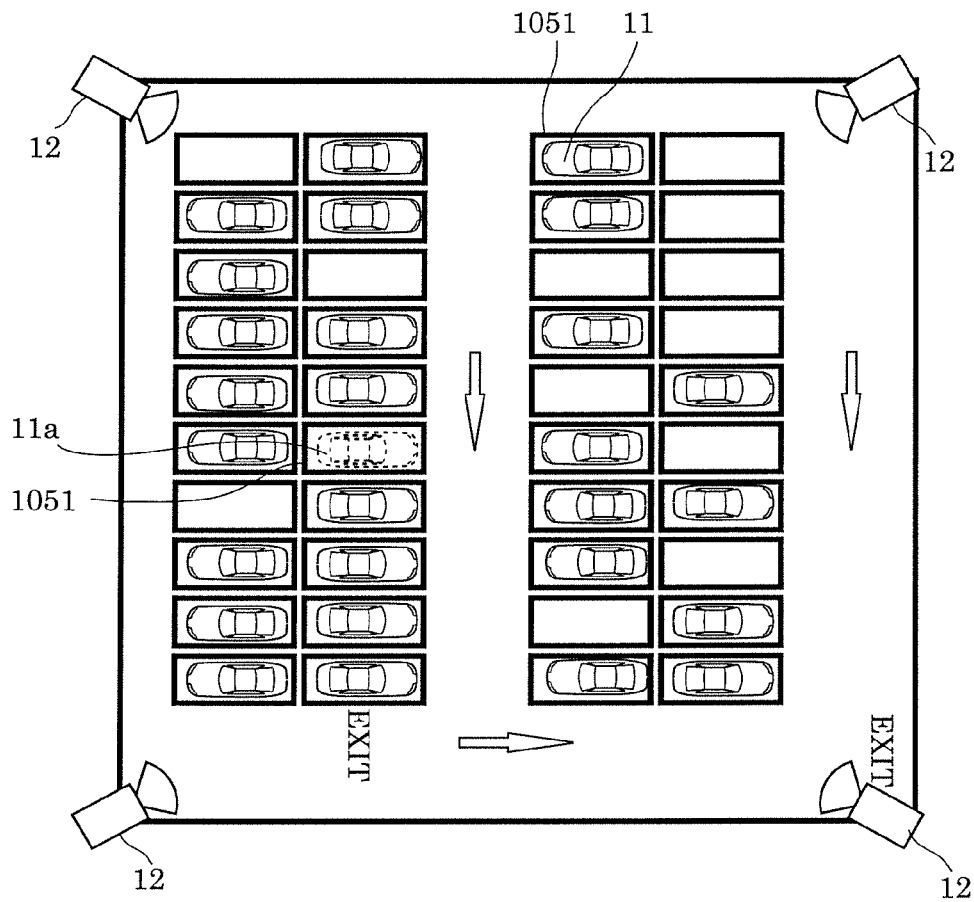
FIG. 8 is a diagram for explaining a process of checking the location of a first moving body that is an object to be identified by the identification device according to Variation 2 of Embodiment 1.

FIG. 7 is a diagram illustrating a functional configuration of identification device 10B according to Variation 2 of Embodiment 1. The elements similar to those illustrated in FIG. 3 are assigned with like reference signs, and the detailed description is omitted. FIG. 8 is a diagram for explaining a process of checking the location of first moving body 11a to be identified by identification device 10B according to Variation 2 of Embodiment 1.

Identification device 10B illustrated in FIG. 7 is different from identification device 10 illustrated in FIG. 3 in that the configurations of map information holder 105 and target location specifier 106 are added.

<Map Information Holder 105>

Map information holder 105 holds map information indicating a map including at least an area capable of accommodating one or more moving bodies. Since moving body 11 is a vehicle also in this variation, the map indicated by the map information may include information on roads, traffic lanes, parking lots, and an operation execution space in which moving body 11 is capable of executing a predetermined operation pattern. In this case, the area capable of accommodating one or more moving bodies corresponds to a parking space or an operation execution space. Note that when a predetermined operation pattern is light control, moving body 11 is capable of executing a predetermined operation pattern in a parking space, and therefore, the map indicated by the map information does not need to include information on an operation execution space.

In the example illustrated in FIG. 8, the map indicated by the map information is a map indicating a parking lot where moving body 11, which is a vehicle, can park, and includes information such as roads on which moving body 11 drives and a parking space (area 1051) in which moving body 11 can park.

<Target Location Specifier 106>

Target location specifier 106 specifies the location of the first moving body on a map based on: map information held by map information holder 105; the locations, in at least one image, of one or more moving bodies 11 that have executed one or more second operation patterns detected by operation detector 102; and the first moving body that is included in at least one image and has been identified by target identifier 103.

Referring to FIG. 8, target location specifier 106 obtains map information indicating plural parking spaces (areas) in any one of which moving body 11 can park. Target location specifier 106 also obtains the locations of one or more moving bodies 11 that have executed one or more second operation patterns detected by operation detector 102, and first moving body 11a that is included in at least one image and has been identified by target identifier 103, as illustrated in FIG. 8. Subsequently, target location specifier 106 specifies the location of area 1051, among areas 1051, in which first moving body 11a is located, using the obtained map information and the location at which first moving body 11a is identified among the locations of one or more moving bodies 11 in at least one image, as illustrated in FIG. 8.

[Advantageous Effects, Etc.]

According to the present variation, it is possible to specify the location, on a map, of a first moving body to be identified, by causing the first moving body to execute a predetermined operation and mapping, onto map information, the first moving body identified in at least one image presenting the predetermined operation. In this way, it is possible to check the location, on a map, of a first moving body to be identified.

A conceivable case, for example, in an underground parking lot, is that a management server that manages the parking lot loses the trace of the first moving body and fails to know which one of parking spaces (areas) the first moving body has parked. According to the present variation, even in this case, it is possible to check in which space in the parking lot the first moving body, which is an object to be identified, is located, by causing the first moving body to execute a predetermined operation. This enables the management server to surely identify moving body 11 located in a space in the parking lot to manage the parking lot.

Variation 3

[Configuration of Moving Body 11C]

Figure 9:
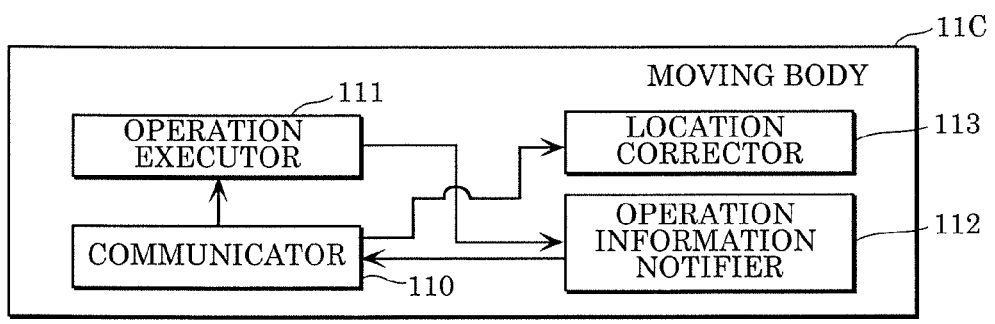
FIG. 9 is a diagram illustrating a functional configuration of a moving body according to Variation 3 of Embodiment 1.

FIG. 9 is a diagram illustrating a functional configuration of moving body 11C according to Variation 3 of Embodiment 1. The elements similar to those illustrated in FIG. 2 are assigned with like reference signs, and the detailed description is omitted. Moving body 11C illustrated in FIG. 9 is different from moving body 11 illustrated in FIG. 2 in that the configuration of location corrector 113 is added.

<Location Corrector 113>

When obtaining the location, on a map, of the first moving body identified by identification device 10C, location corrector 113 corrects location information held by the first moving body.

Moving body 11C has location information indicating self-location. The location information may become incorrect as time elapses, in some cases. In such a case, location corrector 113 performs calibration, that is, correction of the location information held by moving body 11C itself, using the location of moving body 11C which is indicated on the map and is obtained as self-location. The location information held by moving body 11C is correct and calibration is unnecessary, in other cases. In such a case, location corrector 113 may not perform calibration, that is, correction of the location information held by moving body 11C itself even when location corrector 113 obtains, as self-location, the location of moving body 11C on the map.

[Configuration of Identification Device 101C]

Figure 10:
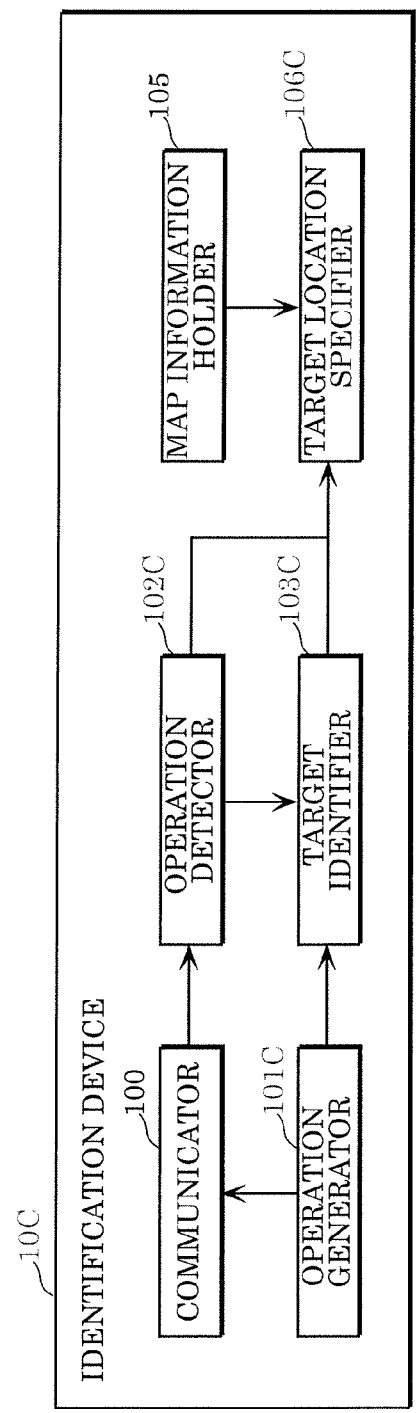
FIG. 10 is a diagram illustrating a functional configuration of an identification device according to Variation 3 of Embodiment 1.

FIG. 10 is a diagram illustrating a functional configuration of identification device 10C according to Variation 3 of Embodiment 1. The elements similar to those illustrated in FIG. 3 or FIG. 7 are assigned with like reference signs, and the detailed description is omitted. Identification device 10C illustrated in FIG. 10, as compared to identification device 10B illustrated in FIG. 7, has different configurations of operation generator 101C, operation detector 102C, target identifier 103C, and target location specifier 106C. The following focuses on the difference between identification device 10C according to this variation and identification device 10B according to Variation 2 of Embodiment 1.

<Operation Generator 101C>

Operation generator 101C may further transmit, at predetermined time intervals, a first operation pattern to the first moving body. After the first moving body has been identified in at least one image by target identifier 103C, operation generator 101C may further generate regularly a first operation pattern to be executed by the first moving body and transmit the first operation pattern to the first moving body. The other aspects of operation generator 101C are the same as those illustrated in the aforementioned Embodiment 1 and Variation 2 thereof, the description is omitted.

<Operation Detector 102C>

Operation detector 102C may further detect, at predetermined time intervals, one or more third operation patterns executed by one or more moving bodies 11C, using at least one image obtained by at least one image obtaining device. After the first moving body in at least one image has been identified by target identifier 103C, operation detector 102C may further detect regularly a third operation pattern executed by the first moving body, using at least one image that includes the first moving body and is captured by image capturing device 12.

<Target Identifier 103C>

When operation generator 101C regularly transmits a first operation pattern to the first moving body, target identifier 103C obtains, from the first moving body, a time at which the first moving body has executed the first operation pattern. Target identifier 103C compares the third operation pattern with the first operation pattern generated by operation generator 101C to determine whether the third operation pattern matches the first operation pattern. When determining that the third operation pattern matches the first operation pattern, target identifier 103C identifies again the first moving body in at least one image.

In this way, target identifier 103C regularly identifies again the first moving body.

<Target Location Specifier 106C>

When specifying the location of the first moving body on a map, target location specifier 106C transmits the specified location on the map to the first moving body to cause the first moving body to correct location information held by the first moving body.

When operation generator 101C regularly transmits a first operation pattern to the first moving body, target location specifier 106C may regularly specify the location of the first moving body on the map. In this case, target location specifier 106C may transmit the specified location on the map to the first moving body. This enables regular calibration of location information held by the first moving body.

[Advantageous Effects, Etc.]

According to the present variation, it is possible to utilize the location, which is indicated on a map and has been specified by identification device 10C, of a first moving body, for the calibration of location information held by the first moving body.

Variation 4

[Configuration of Identification Device 10D]

Figure 11:
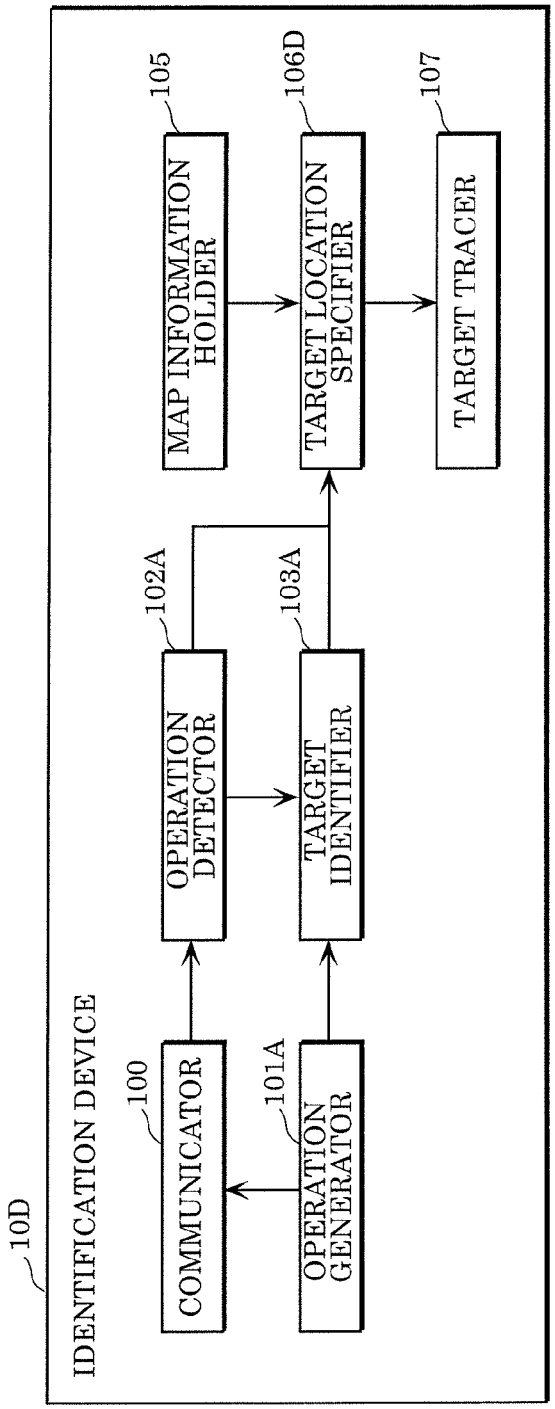
FIG. 11 is a diagram illustrating a functional configuration of an identification device according to Variation 4 of Embodiment 1.

FIG. 11 is a diagram illustrating a functional configuration of identification device 10D according to Variation 4 of Embodiment 1. The elements similar to those illustrated in FIG. 3, FIG. 6, FIG. 7, or FIG. 10 are assigned with like reference signs, and the detailed description is omitted. Identification device 10D illustrated in FIG. 11, as compared to identification device 10C illustrated in FIG. 7, has different configurations of operation generator 101A, operation detector 102A, target identifier 103A, and target location specifier 106D, and an additional configuration of target tracer 107. Since operation generator 101A, operation detector 102A, and target identifier 103A are configured in the same manner as described with reference to FIG. 6 according to the above-described Variation 1, the description is omitted. The following describes target location specifier 106D and target tracer 107.

[Target Location Specifier 106D]

Target location specifier 106D regularly specifies the location of the first moving body on a map. Subsequently, target location specifier 106D regularly notifies target tracer 107 of the specified location of the first moving body on the map. The other aspects of target location specifier 106D are the same as those illustrated in the description of target location specifier 106 according to the above-described Variation 2, the description is omitted.

[Target Tracer 107]

Target tracer 107 obtains time-series locations that are locations, which are indicated on the map and are obtained at predetermined time intervals, of the first moving body identified by target identifier 103A. Target tracer 107 obtains the time-series locations by obtaining the locations, each of which has been specified by target location specifier 106D, of the first moving body on the map at predetermined time intervals.

In this variation, target tracer 107 obtains the time-series locations of the first moving body identified by target identifier 103A by obtaining the location of the first moving body on the map, which has regularly been specified by target location specifier 106D.

[Advantageous Effects, Etc.]

According to the present variation, it is possible to obtain the time-series locations of a first moving body to be identified, by regularly specifying the location of the first moving body. This enables tracing of the first moving body.

Variation 5

[Configuration of Moving Body 11E]

Figure 12:
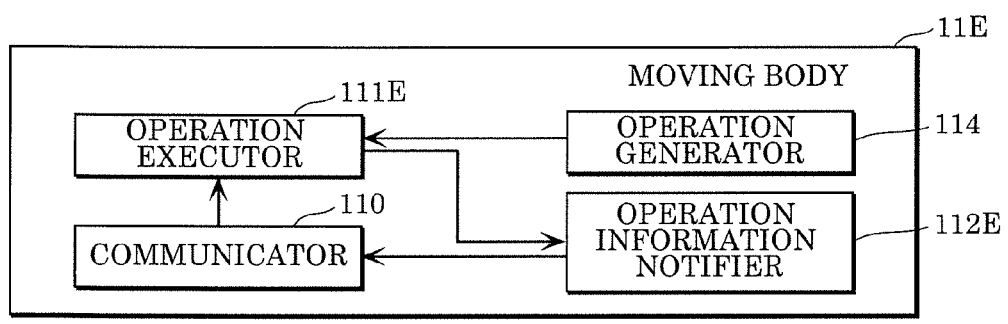
FIG. 12 is a diagram illustrating a functional configuration of a moving body according to Variation 5 of Embodiment 1.

FIG. 12 is a diagram illustrating a functional configuration of moving body 11E according to Variation 5 of Embodiment 1. The elements similar to those illustrated in FIG. 2 are assigned with like reference signs, and the detailed description is omitted. Moving body 11E illustrated in FIG. 12, as compared to moving body 11 illustrated in FIG. 2, has different configurations of operation executor 111E and operation information notifier 112E, and an additional configuration of operation generator 114.

<Operation Generator 114>

Operation generator 114 generates a predetermined operation pattern to be executed by operation generator 114 itself, that is, moving body 11E, and transmits the predetermined operation pattern to operation executor 111E. Operation generator 114 also transmits the generated predetermined operation pattern to identification device 10E via communicator 110.

<Operation Executor 111E>

Operation executor 111E executes a combined operation pattern in which a predetermined operation pattern obtained from operation generator 114 is combined with an operation pattern received from identification device 10E.

Note that operation executor 111E may execute only a predetermined operation pattern obtained from operation generator 114.

<Operation Information Notifier 112E>

Operation information notifier 112E notifies identification device 10E of a time at which operation executor 111E has executed a combined operation pattern.

It should be noted that when operation executor 111E executes only a predetermined operation pattern obtained from operation generator 114, operation information notifier 112E may notify identification device 10E of the execution of the predetermined operation pattern generated by operation generator 114 and the execution time thereof.

[Configuration of Identification Device 10E]

Figure 13:
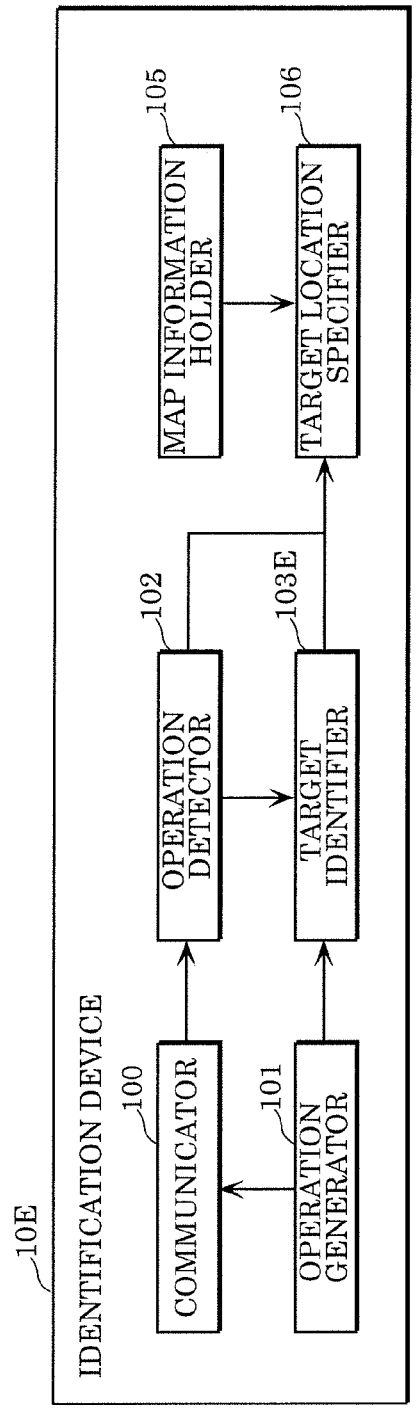
FIG. 13 is a diagram illustrating a functional configuration of an identification device according to Variation 5 of Embodiment 1.

FIG. 13 is a diagram illustrating a functional configuration of identification device 10E according to Variation 5 of Embodiment 1. The elements similar to those illustrated in FIG. 3 or FIG. 7 are assigned with like reference signs, and the detailed description is omitted. Identification device 10E illustrated in FIG. 13 has a different configuration of target identifier 103E, as compared to identification device 10B illustrated in FIG. 7.

<Target Identifier 103E>

Target identifier 103E obtains, from the first moving body, a predetermined operation pattern generated by the first moving body and a time at which a combined operation pattern, in which the predetermined operation pattern is combined with a first operation pattern, has been executed. Target identifier 103E compares the second operation pattern detected at the time from among one or more second operation patterns with the combined operation pattern to determine whether the second operation pattern matches the combined operation pattern. When determining that the second operation pattern detected at the time matches the combined operation pattern, target identifier 103E identifies, as the first moving body, a moving body that is included in at least one image and has executed the second operation pattern detected at the time.

Since the other aspects of target identifier 103E are the same as those illustrated in the above-described Embodiment 1 and Variation 2 thereof, the description is omitted.

[Advantageous Effects, Etc.]

According to the present variation, a first moving body to be identified is caused to execute a combined operation pattern in which an operation pattern generated by identification device 10E is combined with an operation pattern generated by the first moving body. This can reduce a risk that an operation pattern to be executed by a first moving body to be identified is imitated through the bugging of communication lines.

With this, it is possible to reduce more the misidentification of an object to be identified.

Embodiment 2

Embodiment 1 has been described under a precondition that moving body 11 etc. notifies, for instance, identification device 10 of a time at which moving body 11 has executed an operation pattern, but the present disclosure is not limited to this. Moving body 11 etc. does not need to notify identification device 10, for instance, of the time of the execution of the operation pattern. The following describes this case as Embodiment 2.

[Configuration of Moving Body 11F]

Figure 14:
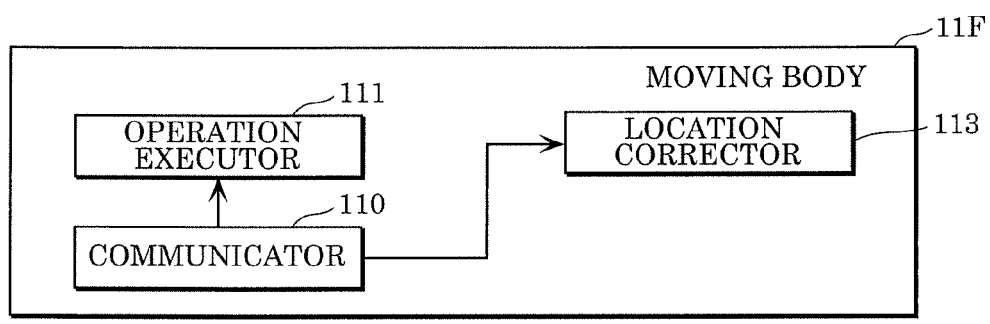
FIG. 14 is a diagram illustrating a functional configuration of a moving body according to Embodiment 2.

FIG. 14 is a diagram illustrating a functional configuration of moving body 11F according to Embodiment 2. The elements similar to those illustrated in FIG. 2 are assigned with like reference signs, and the detailed description is omitted.

Moving body 11F illustrated in FIG. 14 does not include operation information notifier 112, as compared to moving body 11 illustrated in FIG. 2. Note that location corrector 113 is not an indispensable element. In other words, moving body 11F may include only communicator 110 and operation executor 111. Since communicator 110, operation executor 111, and location corrector 113 are configured in the same manner as described in the aforementioned Embodiment 1 and Variation 3 thereof, the description is omitted.

[Configuration of Identification Device 10F]

Figure 15:
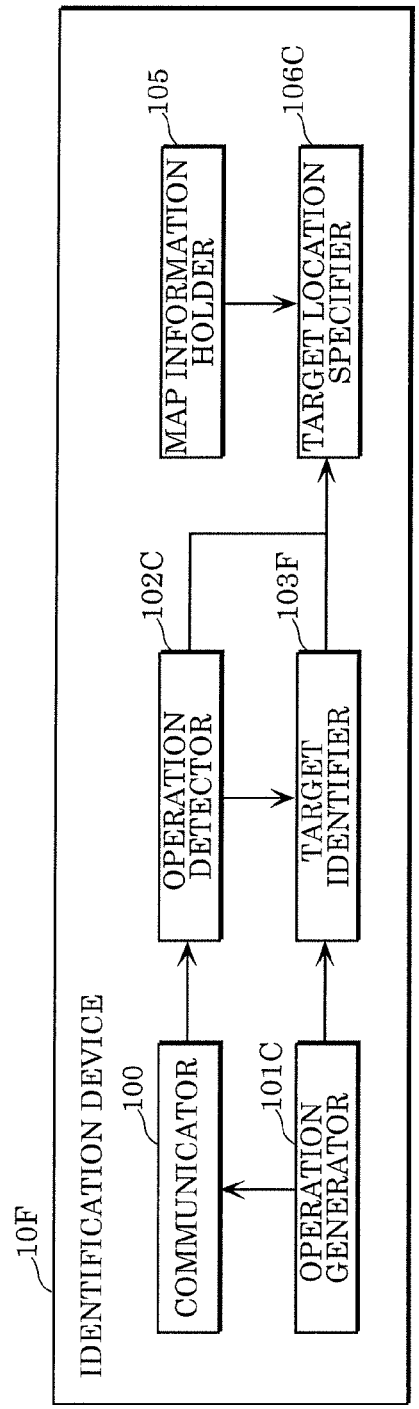
FIG. 15 is a diagram illustrating a functional configuration of an identification device according to Embodiment 2.

FIG. 15 is a diagram illustrating a functional configuration of identification device 10F according to Embodiment 2. The elements similar to those illustrated in FIG. 7 or FIG. 10 are assigned with like reference signs, and the detailed description is omitted. Identification device 10F illustrated in FIG. 15 has a different configuration of target identifier 103F, as compared to identification device 10C illustrated in FIG. 10. Since generator 101C, operation detector 102C, and target location specifier 106C are configured in the same manner as illustrated in the above-described Variation 3 of Embodiment 1, the description is omitted. The following describes target identifier 103F.

<Target Identifier 103F>

Target identifier 103F compares each of one or more second operation patterns detected by operation detector 102 with a first operation pattern generated by operation generator 101 to determine whether the second operation pattern matches the first operation pattern. When determining that the second operation pattern matches the first operation pattern, target identifier 103F identifies, as the first moving body, moving body 11F that is included in at least one image and has executed the second operation pattern determined to match the first operation pattern.

Target identifier 103F may compare a third operation pattern with a first operation pattern generated by operation generator 101C to determine whether the third operation pattern matches the first operation pattern. When determining that the third operation pattern matches the first operation pattern, target identifier 103F identifies again moving body 11F in at least one image as the first moving body. In this way, when moving body 11F includes location corrector 113 and operation generator 101C regularly transmits a first operation pattern to the first moving body, target identifier 103F regularly identifies the first moving body.

Note that when moving body 11F does not include location corrector 113, target identifier 103F does not have to compare a third operation pattern with a first operation pattern generated by operation generator 101C. Even when specifying the location of the first moving body on a map, target location specifier 106C does not have to transmit the specified location on the map to the first moving body.

[Operation of Identification Device 10F]

Next, an operation performed by identification device 10F configured as above will be described. Note that the following describes the case where moving body 11F includes only communicator 110 and operation executor 111.

Figure 16:
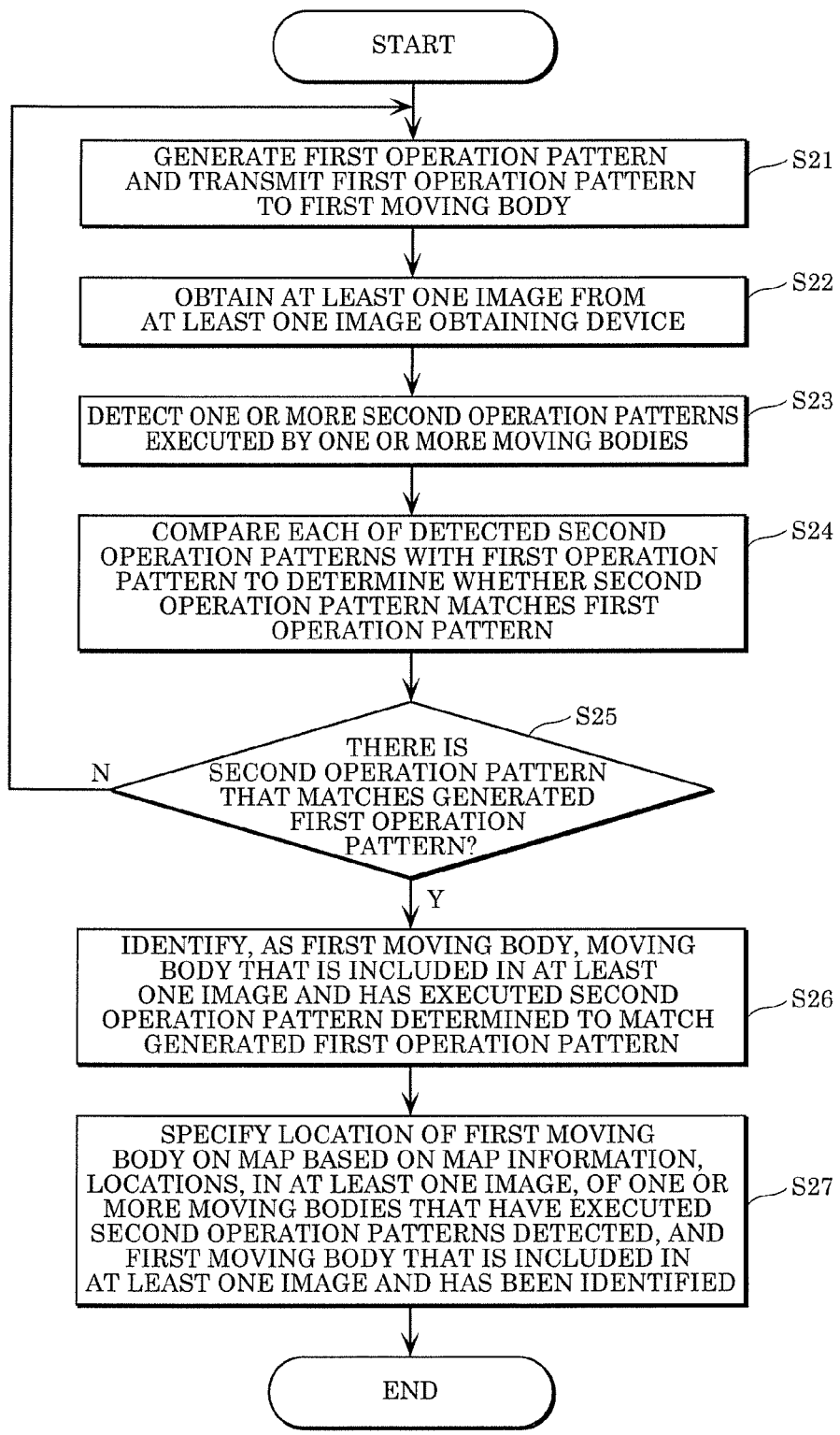
FIG. 16 is a flowchart illustrating an example of an operation performed by the identification device according to Embodiment 2.

FIG. 16 is a flowchart illustrating an example of the operation performed by identification device 10F according to Embodiment 2.

First, identification device 10F generates a first operation pattern and transmits the first operation pattern to a first moving body (S21). More specifically, identification device 10F generates a first operation pattern to be executed by a first moving body to be identified among moving bodies 11F, and transmits the first operation pattern to the first moving body.

Subsequently, identification device 10F obtains at least one image from at least one image obtaining device (S22). More specifically, identification device 10F obtains, from a plurality of image capturing devices 12, at least one image which is obtained by the plurality of image capturing devices 12 and is to be used for detecting an operation pattern executed by moving body 11F to be identified.

Next, identification device 10F detects one or more second operation patterns executed by one or more moving bodies 11F (S23). More specifically, identification device 10F detects one or more second operation patterns executed by one or more moving bodies 11F, using at least one image obtained by the plurality of image capturing devices 12.

Identification device 10F then compares each of one or more second operation patterns detected at step S23 with the first operation pattern to determine whether the second operation pattern matches the first operation pattern (S24). More specifically, identification device 10F compares the generated first operation pattern with each of one or more second operation patterns detected at step S23 to determine whether the generated first operation pattern matches the second operation pattern.

Subsequently, when there is a second operation pattern that matches the generated first operation pattern (Y in S25), identification device 10F identifies, as the first moving body, moving body 11F that is included in at least one image and has executed the second operation pattern determined to match the generated first operation pattern (S26). Note that when the generated first operation pattern does not match the second operation pattern (N in S25), identification device 10F returns to step S21.

Identification device 10F then specifies the location of the first moving body on a map based on map information, the locations of one or more moving bodies 11F that have executed one or more second operation patterns detected in step S23, and the first moving body that is included in at least one image and has been identified in step S26 (S27).

[Advantageous Effects, Etc.]

According to the present embodiment, it is possible to specify the location, on a map, of a first moving body to be identified, by causing the first moving body to execute a predetermined operation and mapping, onto map information, the first moving body identified in at least one image presenting the predetermined operation. Thus, it is possible to check the location, on a map, of a first moving body to be identified.

According to the present embodiment, it is possible to identify, as the first moving body, moving body 11F that is included in at least one image and has executed the second operation pattern that matches the first operation pattern. In other words, it is possible to verify the first moving body, which is moving body 11F to be identified, by causing the first moving body to execute a predetermined operation.

It should be noted that the configuration of identification device 10F is not limited to that described above, and may be configured as will be described in the following variations.

Variation 1

In Variation 1, moving body 11F includes only communicator 110 and operation executor 111 among communicator 110, operation executor 111, and location corrector 113 which are included in moving body 11F illustrated in FIG. 14. The following describes the configuration of identification device 10G.

[Configuration of Identification Device 10G]

Figure 17:
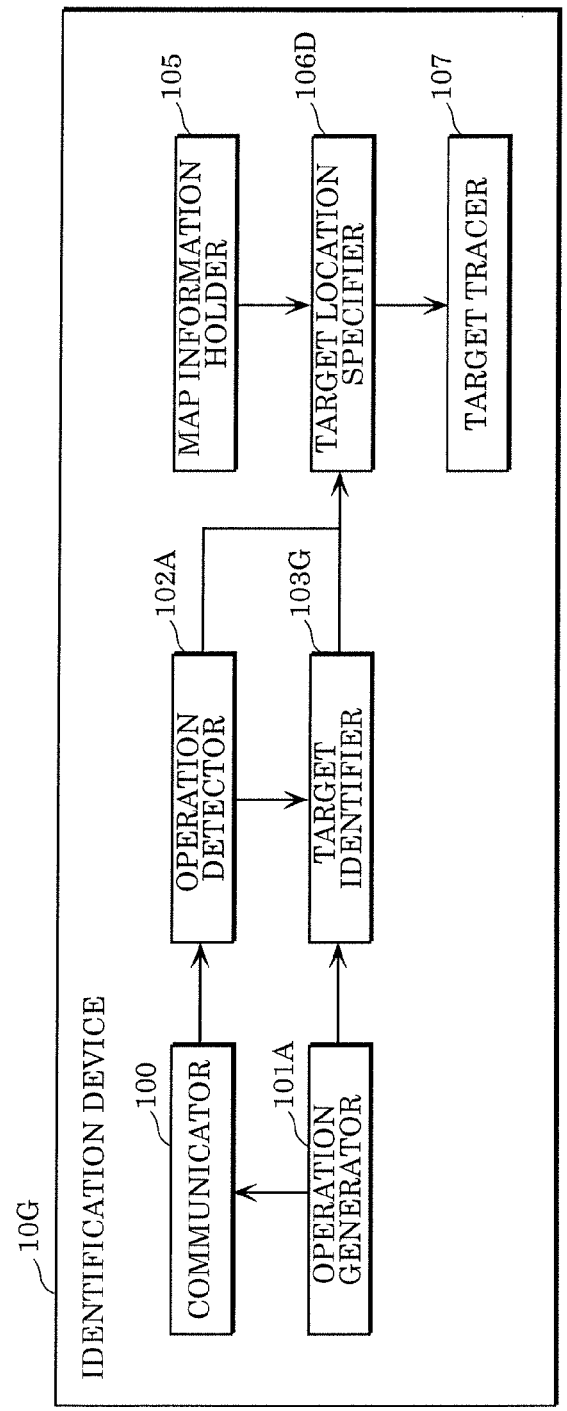
FIG. 17 is a diagram illustrating a functional configuration of an identification device according to Variation 1 of Embodiment 2.

FIG. 17 is a diagram illustrating a functional configuration of identification device 10G according to Variation 1 of Embodiment 2. The elements similar to those illustrated in FIG. 3, FIG. 11, or FIG. 15 are assigned with like reference signs, and the detailed description is omitted. Identification device 10G illustrated in FIG. 17 has different configurations of operation generator 101A, operation detector 102A, target identifier 103G, and target location specifier 106D, and an additional configuration of target tracer 107, as compared to identification device 10F illustrated in FIG. 15. Since operation generator 101A, operation detector 102A, target location specifier 106D, and target tracer 107 illustrated in FIG. 17 are configured in the same manner as illustrated in the above-described Variation 4 of Embodiment 1, the description is omitted. The following describes target identifier 103G.

<Target Identifier 103G>

Target identifier 103G compares each of one or more second operation patterns detected by operation detector 102A with a first operation pattern generated by operation generator 101A to determine whether the second operation pattern matches the first operation pattern. When determining that the second operation pattern matches the first operation pattern, target identifier 103G identifies, as the first moving body, moving body 11F that is included in at least one image and has executed the second operation pattern determined to match the first operation pattern.

Target identifier 103G compares a third operation pattern with the first operation pattern generated by operation generator 101A to determine whether the third operation pattern matches the first operation pattern. When determining that the third operation pattern matches the first operation pattern, target identifier 103G identifies again moving body 11F in at least one image as the first moving body.

Since operation generator 101A regularly transmits a first operation pattern to the first moving body, as described above, target identifier 103G regularly identifies again the first moving body.

[Advantageous Effects, Etc.]

According to the present embodiment, it is possible to obtain time-series locations of a first moving body to be identified, by regularly specifying the location of the first moving body. This enables tracing of the first moving body.

Variation 2

[Configuration of Moving Body 11H]

Figure 18:
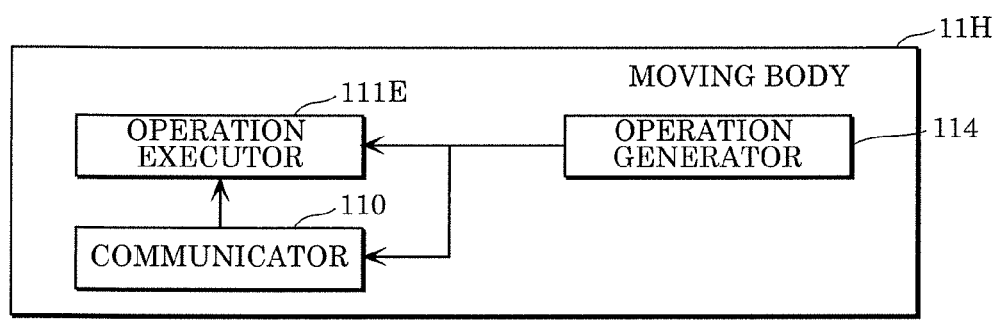
FIG. 18 is a diagram illustrating a functional configuration of a moving body according to Variation 2 of Embodiment 2.

FIG. 18 is a diagram illustrating a functional configuration of moving body 11H according to Variation 2 of Embodiment 2. The elements similar to those illustrated in FIG. 12 or FIG. 14 are assigned with like reference signs, and the detailed description is omitted. Moving body 11H illustrated in FIG. 18, as compared to moving body 11F illustrated in FIG. 14, has a different configuration of operation executor 111E and an additional configuration of operation generator 114, and the configuration of location corrector 113 is deleted. Since operation executor 111E and operation generator 114 illustrated in FIG. 18 are configured in the same manner as described with reference to FIG. 12 in the aforementioned Variation 5 of Embodiment 1, the description is omitted.

[Configuration of Identification Device 10H]

Figure 19:
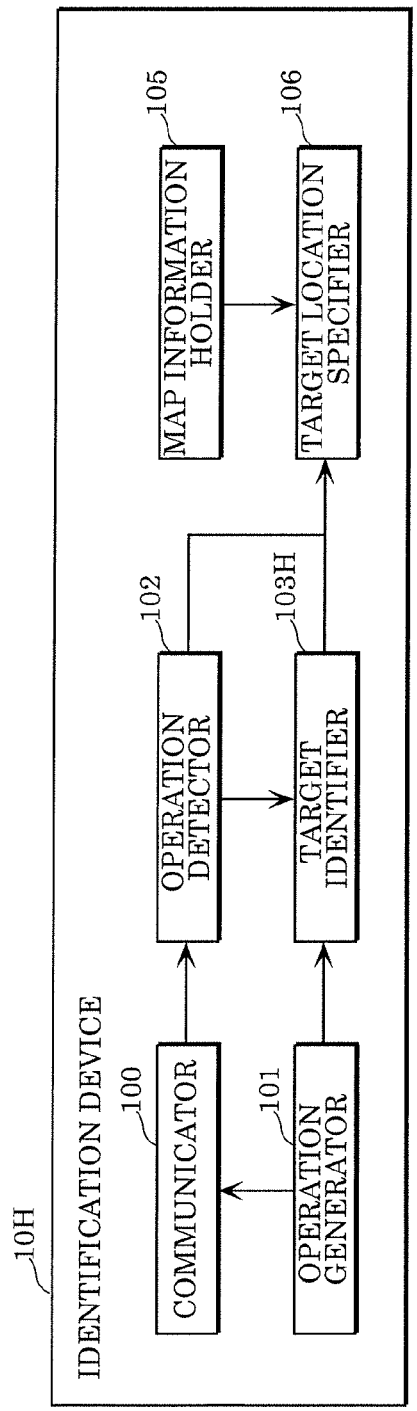
FIG. 19 is a diagram illustrating a functional configuration of an identification device according to Variation 2 of Embodiment 2.

FIG. 19 is a diagram illustrating a functional configuration of identification device 10H according to Variation 2 of Embodiment 2. The elements similar to those illustrated in FIG. 13 or FIG. 15 are assigned with like reference signs, and the detailed description is omitted. Identification device 10H illustrated in FIG. 19 has different configurations of operation generator 101, operation detector 102, target identifier 103H, and target location specifier 106, as compared to identification device 10F illustrated in FIG. 15. Since operation generator 101, operation detector 102, and target location specifier 106 illustrated in FIG. 19 are configured in the same manner as described with reference to FIG. 13 in the above-described Variation 5 of Embodiment 1, the description is omitted. The following describes target identifier 103H.

<Target Identifier 103H>

Target identifier 103H is different from target identifier 103E illustrated in FIG. 13 in that target identifier 103H does not obtain a time at which the first moving body has executed a combined operation pattern. Target identifier 103H therefore obtains, from the first moving body, only a predetermined operation pattern generated by the first moving body.

Target identifier 103H compares each of one or more second operation patterns detected by operation detector 102 with a combined operation pattern in which a predetermined operation pattern obtained from operation generator 114 is combined with an operation pattern generated by operation generator 101, to determine whether the second operation pattern matches the combined operation pattern. When determining that the second operation pattern matches the combined operation pattern, target identifier 103H identifies, as the first moving body, moving body 11H that is included in at least one image and has executed the second operation pattern determined to match the combined operation pattern.

[Advantageous Effects, Etc.]

According to the present variation, a first moving body to be identified is caused to execute a combined operation pattern in which an operation pattern generated by identification device 10H is combined with an operation pattern generated by the first moving body. This can reduce a risk that an operation pattern to be executed by a first moving body to be identified is imitated through the bugging of communication lines.

This can reduce the misidentification of an object to be identified.

Other Embodiments

Although the identification system, the identification device, etc. according to one or more aspects of the present disclosure have been described based on the exemplary embodiments, the present disclosure shall not be limited to these embodiments. Forms obtained by various modifications to foregoing embodiment that can be conceived by a person skilled in the art as well as forms realized by arbitrarily combining structural components and functions in the embodiment within the scope of the essence of the present disclosure are included in the present disclosure.

The present disclosure may be realized as a program for causing a computer to execute the identification method according to the aforementioned one or more aspects.

A program for realizing the identification system and the identification device according to the aforementioned one or more aspects can be typically realized as an LSI which is an integrated circuit. These circuits may be individually realized as one chip or may be realized as one chip including part or all of the circuits.

Each of the processing units to be realized as an integrated circuit is not limited to an LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

It should be noted that each of the elements included in the identification system and the identification device according to the aforementioned one or more aspects may be configured by dedicated hardware or may be realized by executing a software program suitable for each element. Each element may be implemented by a program executor such as a CPU or a processor reading and executing a software program recorded on a recording medium such as a hard disc or a semiconductor memory.

All the numbers used above are exemplary numbers to specifically describe the present disclosure, and the present disclosure is not limited to the illustrated numbers.

Division of a functional block in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions.

An order to execute each step in the flowchart is an exemplary order for specifically describing the present disclosure, and may be other than the above-described order. Furthermore, part of the above-described steps may be executed at the same time as (in parallel to) the execution of other steps.

Forms obtained by various modifications to the foregoing embodiment that can be conceived by a person skilled in the art as well as forms realized by arbitrarily combining structural components and functions in the embodiment within the scope of the essence of the present disclosure are included in the present disclosure.

Each of the elements included in each of the embodiments and the variations thereof may be configured by dedicated hardware or may be realized by executing a software program suitable for each element. Each element may be implemented by a program executor such as a CPU or a processor reading and executing a software program recorded on a recording medium such as a hard disc or a semiconductor memory.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: PCT International Application No. PCT/JP2019/037090 filed on Sep. 20, 2019; and Japanese Patent Application No. 2018-184210 filed on Sep. 28, 2018.

INDUSTRIAL APPLICABILITY

The present disclosure can be used is systems that require verification or location checking of moving bodies such as vehicles, drones, robots, etc.

What is claimed is:

1. An identification device for identifying one or more moving bodies, the identification device comprising:
    a processor that generates a first operation pattern to be executed by a first moving body which is at least one of the one or more moving bodies;
    a communication interface that transmits the first operation pattern to the first moving body;
    the processor that detects one or more second operation patterns executed by the one or more moving bodies, using at least one image obtained by at least one camera;
    the communication interface that receives, from the first moving body, a time at which the first moving body has executed the first operation pattern; and the processor that compares the first operation pattern with a second operation pattern detected at the time from the one or more second operation patterns to determine whether the second operation pattern matches the first operation pattern, wherein when the second operation pattern matches the first operation pattern, the processor identifies the first moving body, as being included in the at least one image and having executed the second operation pattern detected at the time.

2. The identification device according to claim 1, wherein the first operation pattern and the second operation pattern are each a pattern in which a light included in the first moving body is controlled.

3. The identification device according to claim 2, wherein the first moving body is a vehicle, and
the first operation pattern and the second operation pattern are each a pattern in which turning on and off of at least one of headlights, direction-indicator lamps, or tail lamps of the vehicle is controlled.

4. The identification device according to claim 1,
wherein the processor is configured to detect an anomaly in the first moving body identified in the at least one image,
the communication interface further transmits the first operation pattern to the first moving body at predetermined time intervals,
the processor further detects, at the predetermined time intervals, a third operation pattern executed by the first moving body, using at least one image obtained by the at least one camera, and
the processor compares the third operation pattern with the first operation pattern, and detects an anomaly in the first moving body when the third operation pattern does not match the first operation pattern.

5. The identification device according to claim 1,
wherein the processor specifies a location of the first moving body on a map based on (i) map information indicating the map including at least an area capable of accommodating the one or more moving bodies, (ii) locations, in the at least one image, of the one or more moving bodies that have executed the one or more second operation patterns, and (iii) the first moving body that is identified in the at least one image.

6. The identification device according to claim 5, wherein when specifying the location of the first moving body on the map, the processor further transmits the location specified on the map to the first moving body to cause the first moving body to correct location information held by the first moving body.

7. The identification device according to claim 5,
wherein the processor obtains time-series locations that are locations, which are indicated on the map and are obtained at predetermined time intervals, of the first moving body,
the communication interface transmits the first operation pattern to the first moving body at the predetermined time intervals,
the processor detects, at the predetermined time intervals, a third operation pattern executed by the first moving body, using at least one image obtained by the at least one camera,
the processor determines whether the third operation pattern matches the first operation pattern, and identifies again the first moving body in the at least one image when the third operation pattern matches the first operation pattern, the processor specifies the location of the first moving body on the map at the predetermined time intervals based on the map information and a location, in the at least one image, of the first moving body identified again in the at least image, and the processor obtains the time-series locations by obtaining the locations of the first moving body on the map at the predetermined time intervals.

8. The identification device according to claim 1, wherein when obtaining, from the first moving body, a predetermined operation pattern generated by the first moving body and a time at which a combined operation pattern has been executed, the combined operation pattern being generated by combining the predetermined operation pattern with the first operation pattern, the processor compares the combined operation pattern with the second operation pattern detected at the time from the one or more second operation patterns to determine whether the second operation pattern matches the combined operation pattern, and when determining that the second operation pattern matches the combined operation pattern, the processor identifies the first moving body as being included in the at least one image and having executed the second operation pattern detected at the time.

9. An identification device for identifying one or more moving bodies, the identification device comprising:
a processor that generates a first operation pattern to be executed by a first moving body which is at least one of the one or more moving bodies;
a communication interface that transmits the first operation pattern to the first moving body;
the processor that detects one or more second operation patterns executed by the one or more moving bodies, using at least one image obtained by at least one camera;
the processor that compares each of the one or more second operation patterns with the first operation pattern to determine whether the second operation pattern matches the first operation pattern, and identifies the first moving body is as being included in the at least one image and having executed the second operation pattern determined to match the first operation pattern; and
the processor that specifies a location of the first moving body on a map based on (i) map information indicating the map including at least an area capable of accommodating the one or more moving bodies, (ii) locations, in the at least one image, of the one or more moving bodies that have executed the one or more second operation patterns detected by the processor, and (iii) the first moving body that is identified in the at least one image.

10. An identification method for identifying one or more moving bodies, the identification method comprising:
generating a first operation pattern to be executed by a first moving body which is at least one of the one or more moving bodies, and transmitting the first operation pattern to the first moving body;
detecting one or more second operation patterns executed by the one or more moving bodies, using at least one image obtained by at least one camera;
receiving, from the first moving body, a time at which the first moving body has executed the first operation pattern, and comparing a second operation pattern detected at the time from the one or more second operation patterns with the first operation pattern generated in the generating to determine whether the second operation pattern matches the first operation pattern; and in the comparing, when the second operation pattern matches the first operation pattern, identifying the first moving body as being included in the at least one image and having executed the second operation pattern detected at the time.

11. An identification system comprising one or more moving bodies and an identification device for identifying the one or more moving bodies, wherein the identification device includes:
- a first processor that generates a first operation pattern to be executed by a first moving body which is at least one of the one or more moving bodies;
- a first communication interface that transmits the first operation pattern to the first moving body;
- the first processor that detects one or more second operation patterns executed by the one or more moving bodies, using at least one image obtained by at least one camera; and
- the first processor that obtains, from the first moving body, a time at which the first moving body has executed the first operation pattern, and compares the first operation pattern with a second operation pattern detected at the time from the one or more second operation patterns to determine whether the second operation pattern matches the first operation pattern, wherein when the second operation pattern matches the first operation pattern, the first processor identifies the first moving body as being included in the at least one image and has having executed the second operation pattern detected at the time, and each of the one or more moving bodies includes:
- a second processor that executes an operation pattern received from the identification device; and
- a second communication interface that notifies the identification device of a time at which the second processor has executed the operation pattern.

12. A non-transitory computer-readable recording medium for use in a computer, the recording medium having a computer program recorded thereon for causing the computer to execute an identification method for identifying one or more moving bodies, wherein the identification method includes:
generating a first operation pattern to be executed by a first moving body which is at least one of the one or more moving bodies, and transmitting the first operation pattern to the first moving body;

detecting one or more second operation patterns executed by the one or more moving bodies, using at least one image obtained by at least one camera; and obtaining, from the first moving body, a time at which the first moving body has executed the first operation pattern, and comparing a second operation pattern detected at the time from the one or more second operation patterns with the first operation pattern generated in the generating to determine whether the second operation pattern matches the first operation pattern, wherein in the comparing, when the second operation pattern matches the first operation pattern, identifying the first moving body as being included in the at least one image and having executed the second operation pattern detected at the time.

* * * * *